United States Patent
Keller

(10) Patent No.: US 6,534,577 B1
(45) Date of Patent: Mar. 18, 2003

(54) PVC-CONTAINING MATERIAL WITH CITRATE ESTERS

(75) Inventor: Maik Johannes Keller, Oldenburg (DE)

(73) Assignee: era Beschichtung GmbH & Co., Stolzenau (DE)

( * ) Notice: Subject to any disclaimer, the term of this patent is extended or adjusted under 35 U.S.C. 154(b) by 0 days.

(21) Appl. No.: 09/594,901

(22) Filed: Jun. 15, 2000

(30) Foreign Application Priority Data

Jun. 21, 1999 (DE) .......................... 199 28 239

(51) Int. Cl.⁷ .................. C08L 27/06; C08K 3/00; C08K 5/11
(52) U.S. Cl. ............... 524/317; 524/308; 524/309; 524/310; 524/311; 524/433; 524/567; 524/569
(58) Field of Search ................ 524/310, 311, 524/317, 569, 567, 309, 308, 433

(56) References Cited

U.S. PATENT DOCUMENTS

| | | | | |
|---|---|---|---|---|
| 2,956,855 A | | 10/1960 | Havens ................ | 18/54 |
| 3,928,275 A | | 12/1975 | Hiyama et al. ........ | 260/31.8 |
| 3,929,712 A | | 12/1975 | Hiyama et al. ........ | 260/31.8 |
| 4,464,502 A | * | 8/1984 | Jacobs ................ | 524/411 |
| 4,572,740 A | * | 2/1986 | Kretzschmann et al. .... | 106/122 |
| 4,711,922 A | * | 12/1987 | Hull et al. ............ | 524/310 |
| 4,740,545 A | * | 4/1988 | Ohachi ................ | 524/314 |
| 5,319,028 A | * | 6/1994 | Nakamura et al. ...... | 525/227 |
| 5,350,550 A | * | 9/1994 | Kitazawa et al. ...... | 264/45.1 |

FOREIGN PATENT DOCUMENTS

| | | | | |
|---|---|---|---|---|
| DE | 3520750 | | 2/1986 | |
| DE | 3546725 | | 4/1991 | |
| JP | 53129241 | * | 11/1978 | ........... 524/301 |
| WO | WO 98/51657 | * | 11/1998 | ........... C07C/69/34 |

OTHER PUBLICATIONS

Prescott et al. (Citric acid ester politicizes, Modern Plastics, Oct. 1952, pp. 134–138, 200 and 201).*

Prescott et al., Citric Acid Ester Plasticizers, Modern Plastics, Oct. 1952, pp. 134, 136 138, 200, and 201.

* cited by examiner

Primary Examiner—David W. Wu
Assistant Examiner—Kelechi Egwim
(74) Attorney, Agent, or Firm—Sutherland Asbill & Asbill LLP

(57) ABSTRACT

PVC-containing material with a citrate, whose alcohol component contains 2 to 12 carbon atoms and in which the hydroxyl group of the citrate is not esterified.

17 Claims, No Drawings

PVC-CONTAINING MATERIAL WITH CITRATE ESTERS

The invention relates to a novel PVC-containing material with a citrate, whose alcohol component contains 2 to 12 carbon atoms.

Polyvinyl chloride (PVC) is one of the economically most important polymers and is widely used as rigid PVC, but in particular as soft or plasticized PVC.

For the production of a plasticized PVC, plasticizers are added to the PVC and the preferred plasticizers are phthalates. Over the last few years phthalates have been increasingly critically evaluated, particularly as a result of their physiological behaviour. Phthalates have a certain stability with respect to physicochemical and biological decomposition reactions. Admittedly the acute toxicity of phthalates is generally low, but the preponderantly used nonyl, decyl and undecyl phthalates have a carcinogenic, teratogenic and embryotoxic action in high dosages in rats and mice. Due to their poor decomposition behaviour phthalates are in particular concentrated in the hepatic tissue of the body.

The physiologically hazardous nature of phthalates in conjunction with PVC is more particularly encountered in their joint combustion products. As a result of the content of aromatic hydrocarbons the combustion products produce a large amount of soot and dioxin formation is also aided by the presence of chlorine. Moreover, high smoke densities occur due to the frequently necessary use of antimony trioxide. Carbonate-based fireproofing agents, which can also reduce a critical hydrogen chloride emission, do not act very effectively, because the necessary quantities mare so large that there is a significant deterioration to the physical property values excluding a use of carbonates.

It is only possible to a limited extent, for the same reason, to use hydroxides such as e.g. aluminium hydroxide and magnesium hydroxide, which also give a lower smoke density in the case of a fire.

The ecologically hazardous nature of phthalate-containing PVC materials is in particular due to poor recycling and disposal behaviour. In the case of disposal in combustion plants the aforementioned high soot proportion and possible dioxin formation give rise to significant problems when using phthalates. With respect to the liberated hydrogen chloride occurring on burning PVC, modern plant designs offer a recycling or reclamation possibility. Due to the stability to microorganisms biological and biochemical decomposition processes are impossible.

Apart from the physiologically and ecologically hazardous nature of phthalate-containing PVC materials, their physical property values also require improvement. In particular, improvements are needed with respect to fogging, i.e. the volatile fraction which the PVC-containing material loses within a certain time at a certain temperature, as well as migration, i.e. the weight loss of PVC-containing material when stored on activated carbon for a certain time at a certain temperature. Embrittlement, low temperature flexibility, burning rate and light fastness are other important characteristic quantities.

DE 35 46 725 C2 and DE 35 20 750 C2 disclose polyvinyl chloride compositions with citrates as plasticizers and processes for the production thereof. Use is exclusively made of citrates in which also the hydroxyl group of the citrate is esterified. The completely esterified citrates are comparatively expensive.

To avoid the above-described risks and disadvantages tests have been carried out for the development of alternative plasticizers and attempts have also been made to develop PVC-free polymers, which can be used without plasticizers.

Significance has been acquired by materials from thermoplastic polyolefins (TPO), and polyurethanes (PUR). The flame resistance setting required in the case of said materials complicated modifications and the production and processing processes were more complicated and costly. In specific cases the end product only contains 50% of the original polymer matrix. Thermoplastic polyolefins and polyurethanes with the necessary characteristics are also roughly twice as expensive as the corresponding PVC products.

Adipates and phosphates were tested as substitutes for the above-discussed phthalates as plasticizer additives for PVC. These esters are free from aromatic hydrocarbons, so that the critical combustion products do not occur. However, these esters have significantly inferior characteristics for important product parameters. In addition their processing is much more difficult and the price is increased compared with phthalate-containing PVC materials.

The problem of the invention is to provide a PVC-containing material, which does not suffer from the prior art disadvantages and which in particular increases the physiological and ecological compatibility, has improved physical characteristics and can be processed with conventional production and processing processes, whilst also being inexpensive.

According to the invention this problem is solved in that the hydroxyl group of the citrate is not esterified.

Compared with phthalates, citrates have an excellent compatibility on being taken up by the organism. The esters are cleaved into the relevant alcohols and the completely unobjectionable citric acid. Thus, there is no concentration in the organism. As there is a freedom from aromatic hydrocarbons, there is also a considerably reduced soot formation. Thus, an important reactant for the particularly critical dioxin formation is missing. Compared with alternative materials a,PVC-containing material has a much better price-efficiency ratio using citrates as the plasticizer additive.

In particularly preferred manner the chain length of the alcohol component of the citrate is in the range $C_5$–$C_{12}$.

In particularly preferred manner the chain length of the alcohol component of the citrate is in the range $C_6$–$C_{10}$.

The alcohol component can be branched or unbranched alcohols, optionally also polyfunctional alcohols.

Advantageously the alcohol component of the citrate comprises a mixture of different alcohols with a chain length range of $C_5$–$C_{12}$.

Particular preference is given to a PVC-containing material, in which the citrate proportion is 35 to 65 wt. %.

Appropriately the PVC-containing material comprises stabilizers with a proportion of 1 to 5 wt. %.

Particularly appropriately the stabilizers comprise calcium/zinc or barium/zinc compounds.

Advantageously the PVC-containing material comprises pigments with a proportion of 0 to 15 wt. %.

In particularly preferred manner the PVC-containing material comprises fireproofing agents in a range 0 to 20 wt. %.

Particularly appropriately the fireproofing agents comprise aluminium and/or magnesium hydroxide. It is obviously also possible to use-other conventional fireproofing agents, such as e.g. antimony trioxide.

Advantageously the PVC-containing material comprises blowing agents, e.g. azodicarbonamide, in a range of 0.1 to 2 wt. %. Other conventional blowing agents can also be used.

The PVC-containing material is in the form of a foam sheet, which can be produced using per se known processes.

In particularly preferred manner the PVC-containing material is in the form of a reinforced foam sheet, which can be produced by coating support materials using per se known processes.

The support material is preferably a textile fabric, knitted fabric, fleece, metal foil and/or sheet and/or foam of other polymer materials.

The PVC-containing material can also be in the form of a rigid moulding, which can be produced using per se known processes.

With respect to the foam sheet, the reinforced foam sheet and the rigid moulding the hydroxyl group of the citrate can be esterified.

To permit an easier understanding of the invention and to make clear further features thereof, the invention is described hereinafter relative to a number of examples.

EXAMPLE 1

A citrate is prepared from citric acid and alcohols with a chain length range of $C_6$–$C_{10}$. Using a conventional mixing unit the PVC material (e.g. processed PVC and reclaim) is mixed into the citrate. Preferably weight proportions of 35 to 65% are set. Additives conventionally contained in plastisols are added, e.g. stabilizers, preferably based on calcium/zinc compounds with weight proportions of preferably 1 to 5%, pigments with weight proportions of preferably 0 to 15%, as well as substances effective as fireproofing agents, such as e.g. $AL(OH)_3$, $Mg(OH)_2$ and minerals containing magnesium/calcium carbonates and optionally chemically bound water, preferably in weight proportions of 0 to 20%.

EXAMPLE 2

The composition prepared according to example 1 is adjusted in such a way that a viscosity suitable for a coating process is obtained.

One part of this composition is vented and immediately prepared for processing for a standard plastisol coating process. This part is referred to hereinafter as the "superstrate". In a further part of said composition is dispersed as a suitable blowing agent azodicarbonamide in weight proportions of 0.1 to 2%. This part is also vented and prepared for processing in the coating process. This part is called hereinafter the "foam coat". A further part of the composition prepared according to example 1 is so diluted by adding the described citrate in a suitable mixing unit that screen roll processing is possible. This part is subsequently called the "lining coat". The compositions prepared are used on a coating installation typical for indirect coating purposes for the production of an artificial leather.

The superstrate is spread on release paper with a thickness of preferably 0.1 to 0.8 mm using a doctor blade or reverse roll coater. A partial gelling takes place in a drying tunnel at air temperatures of preferably 120 to 230° C. and operating speeds of preferably 3 to 50 m/min. Following recooling on a cooling roller system the foam coat is spread onto said hardened coat with a thickness of preferably 0.1 to 0.8 mm. With air temperatures of preferably 120 to 250° C., as desired, a pregelling, prefoaming or complete foaming takes place in a further drying tunnel.

After subsequent recooling the screen roll processing of the lining coat takes place with a quantity of preferably 30 to 200 g/m² using a corresponding screen roll on the hardened precoat, i.e. the foam coat.

In said coating is inserted an elastic knitted fabric with a weight per unit area of preferably 50 to 160 g/m². To ensure a firm bond, said system passes through a roll gap.

At air temperatures of preferably 140 to 250° C. in a third drying tunnel take place the complete gelling of the last material coating, as well as the final gelling of the preceding coatings and the complete foaming of the preceding material layer.

Following cooling and demoulding of the release paper in a conventional screen roll installation takes place the application of preferably 1 to 5 coatings of a standard PVC acrylate varnish or paint with a coating weight of preferably 5 to 30 g/m² wet/coating to protect against wear or for the decorative design of the PVC cover coating.

On such a material is applied by an embossing roller of an embossing calender typical for plasticized PVC processing a surface structure simulating a leather surface. Surface temperatures of preferably 120 to 240° C. are produced on the PVC on passing through a heating roller and a radiator means and the graining made by the active pressure in the plasticized surface through the cooling of the embossing roller and a subsequent system of cooling rollers is hardened.

After making up an artificial leather is provided, which can be used as a seat cover in car interiors or as furniture artificial leather. If for production purposes use is made of a knitted fabric with a very high extensibility and the material is subsequently microperforated, it can be lined in the so-called Woodstock process directly onto corresponding support or carrier parts, e.g. door panels in the car interior.

The citrate-containing PVC-containing material was tested under special testing conditions. The results are given below in table 1 and for comparison purposes it lists corresponding results for a phthalate-containing PVC material. The fogging test is understood to mean the measurement of the proportion of volatile constituents of the PVC-containing material lost by the latter over a period of 16 hours at a temperature of 100° C. Migration describes the weight loss of the PVC-containing material when stored on activated carbon for a period of 24 hours at a temperature of 90° C. The weight loss describes the weight loss of the PVC-containing material at a temperature of 90° C. over a 168 hour period. Embrittlement is understood to mean the reduction of the breaking elongation at a temperature of 90° C. over a 168 hour period. The low temperature flexibility indicates up to which temperature it is possible to detect a flexibility of the PVC-containing material. The burning rate describes the flame propagation rate in the PVC-containing material without additional fireproofing agents. The light fastness describes the period of time after which, under a specific UV irradiation, it is possible to detect an identical yellowing based on the grey scale.

TABLE 1

| Test | PVC-containing material with citrate with $C_6$–$C_{10}$ | PVC-containing material with phthalate with $C_9$–$C_{12}$ |
| --- | --- | --- |
| Fogging | 0.3–0.6% | 0.6–2.0% |
| Migration | 1.0–2.0% | 3.0–5.0% |
| Weight loss | 0.4–0.6% | 0.9–1.5% |
| Embrittlement | unchanged | 15% |
| Low temperature flexibility | −35° C. | −30° C. |
| Burning rate | approx. 15 mm/min | approx. 40 mm/min |
| Light fastness | 120 h | 78 h |

As can be gathered from table 1, the citrate-containing PVC-containing material has much better physical property values than phthalate-containing PVC material. Particular reference is made to the significantly reduced migration, the lack of embrittlement and the greatly reduced burning rate.

EXAMPLE 3

Up to the second coat a fabric is prepared as in example 2. In place of the third coat with screen rolls, there is a further application of a second foam coat in a thickness of 0.1 to 0.8 mm. This foam coat can be significantly modified compared with the upper coat or the first foam coat.

The complete foaming and gelling of this coat and the preceding coats takes place in the following, third drying tunnel at air temperatures of preferably 150 to 250° C. Following cooling and demoulding of the release paper there is once again on a standard screen roll system an application of preferably 1 to 5 coatings of a standard PVC acrylate paint or varnish or a polyurethane paint or varnish with a coating weight of preferably 5 to 30 g/m² wet/coating for wear protection or for the decorative design of the PVC coating. Onto the back and using the same or a further screen roll system application takes place in the same or a separate passage of a special adhesive varnish preferably in the form of 1 to 3 coatings with a coating weight of preferably 8 to 30 g/m² wet/coating. Onto this material using an embossing roller of an embossing calender typical for plasticized PVC processing is applied a surface structure simulating a leather surface. Surface temperatures of preferably 120 to 250° C. are produced on the PVC on passing through a heating roller and radiator system and the graining made in the plasticized surface by the effective.pressure is hardened by the cooling of the embossing roller and a subsequent provision of cooling rollers.

As a typical foam sheet this fabric can be lined onto door panels, dashboards or other panels by application of a conventional deep drawing or pressing process and also has the property parameters given in table 1 and which are significantly improved compared with a phthalate-containing PVC product.

EXAMPLE 4

A plastisol corresponding to the superstrate of example 2 is prepared directly for coating in the direct spreading process.

A removed part of this composition is added to a suitable primer system based on precrosslinked isocyanates. Onto a fabric with a weight per unit area of preferably 100 to 250 g/m and a thread count of preferably 6 to 25/cm this adhesive coat is applied with a coating weight of preferably 30 to 100 g/m² using a conventional tenter frame on an air knife system.

The plastisol applied is pregelled in a drying tunnel at air temperatures of prefeerably 120 to 200° C. and operating speeds of preferably 5 to 60 m/min. The thus coated fabric passes through a calender and then a cooling roller system. On a following doctor blade system a follow-up coat with a coating weight of preferably 50 to 500 g/m² is applied. In the following, second drying tunnel the final gelling of the precoat and the gelling of the applied coat take place at air temperatures of preferably 120 to 250° C. and the aforementioned operating speed. Once again there is a passage through a calender and a cooling roller system. A paint coat is then applied on a screen means directly following the coating installation.

The resulting fabric can be used as a tarpaulin coated on one side and also has the characteristics given in table 1.

EXAMPLE 5

A fabric produced according to example 4 is coated in accordance with example 3 on its uncoated back. The thus completed fabric is made up as a truck tarpaulin or tent awning and has the characteristic values given in table 1. The toxicological unobjectionability of the citrate permits the use of the tarpaulins produced according to example 5 more particularly as truck tarpaulins for the transportation of foods. For such transportation purposes the light fastness given in table 1 represents an enormous advantage.

EXAMPLE 6

With a special formulation for use in car interiors, a fabric according to example 4 is produced and is supplemented by the application of an additional paint coating on the top coating. A graining is applied using a conventional embossing calender, as shown in example 2.

The resulting fabric can be used as a cargo space cover in combi vehicles.

EXAMPLE 7

A superstrate having the material composition of example 2, but differing in one point through the preferred use of suspension PVC, is gelled in a suitable reactor and then granulated as a plasticized material. To this granular material is added corresponding ground material obtained from cutting waste of materials produced according to example 3. It is also possible to add modifying polymers in a suitable granular form. This mixture is plasticized in an extruder. A sheet is discharged by means of a sheet die. This sheet is completed by subsequent lining on a knitted fabric and then processing in accordance with example 2 to a compact artificial leather. Unlike in example 2, in that in place of the release paper, top coat and foam, lining is brought about in that the above-described sheet enters the screen means of a machine system comparable to example 2. The product obtained has the characteristics given in table 1.

As a modification to the above procedure, it is also conceivable to produce a compact artificial leather using a similar sheet, but obtained using an identical raw material mixture by means of extrusion and passage through a melt roll calender. It is also possible to subsequently treat a sheet produced according to the above process with screen means on the front and back and embossing in the manner described in example 3. Such a sheet can be used as a furniture decorating sheet when it has surface structures corresponding to wood. With an adapted surface design it can also be used as an antidazzle visor sheet conventionally used in car interior furnishings.

The features of the invention disclosed in the above description and in the claims can be essential to the implementation of the different embodiments of the invention either singly or in random combination.

What is claimed is:

1. PVC-containing material with a citrate, characterized in that the hydroxyl group of the citrate is not esterified, the citrate proportion is 35 to 65 wt %, and the chain length of the alcohol component of the citrate is in the range $C_5$–$C_{12}$.

2. PVC-containing material according to claim 1, characterized in that the chain length of the alcohol component of the citrate is in the range $C_6$–$C_{10}$.

3. PVC-containing material according to claim 1, characterized in that the alcohol component comprises unbranched alcohols.

4. PVC-containing material according to claim 1, characterized in that the alcohol component comprises branched alcohols.

5. PVC-containing material according to claim 1, characterized in that the alcohol component comprises polyfunctional alcohols.

6. PVC-containing material according to claim 1, characterized in that the alcohol component comprises a mixture of different alcohols with a chain length range of $C_5$–$C_{12}$.

7. PVC-containing material according to claim 1, characterized in that it comprises stabilizers in a proportion of 1 to 5 wt. %.

8. PVC-containing material according to claim 7, characterized in that the stabilizers are calcium/zinc or barium/zinc compounds.

9. PVC-containing material according to claim 1, characterized in that it comprises pigments in a proportion of 0 to 15 wt. %.

10. PVC-containing material according to claim 1, characterized in that it comprises fireproofing agents in a range of 0 to 20 wt. %.

11. PVC-containing material according to claim 10, characterized in that the fireproofing agents are aluminium and/or magnesium hydroxides.

12. PVC-containing material according to claim 1, characterized in that it comprises blowing agents in a range 0.1 to 2 wt. %.

13. PVC-containing material according to claim 12, characterized in that the blowing agent is azodicarbonamide.

14. PVC-containing material according to one claim 1, characterized in that it is in the form of a foam sheet, which can be produced using per se known processes.

15. PVC-containing material according to claim 14, characterized in that it is in the form of a reinforced foam sheet, which can be produced by coating support material using per se known processes.

16. PVC-containing material according to claim 15, characterized in that the support material is a textile fabric, knitted fabric, fleece, metal foil and/or film and/or foam of other polymer materials.

17. PVC-containing material according to claim 1, characterized in that it is in the form of a rigid moulding, which can be produced using per se known processes.

* * * * *